United States Patent
Kim et al.

(10) Patent No.: US 7,027,725 B2
(45) Date of Patent: Apr. 11, 2006

(54) HEATING SYSTEM OF FLOATING STRUCTURE INCLUDING HEATING PANEL HAVING ROUND TO ELLIPTIC INNER FLUID PATHWAY

(75) Inventors: Mun-Sik Kim, Cheongju-si (KR); Seong-Chan Park, Cheongju-si (KR); Sung-Seock Hwang, Cheongju-si (KR); Se-Chang Kang, Cheongju-si (KR); Dong-Sik Jang, Pusan (KR); Jang-Seok Park, Chungcheongbuk-do (KR)

(73) Assignee: LG Chem. Ltd., (KR)

( * ) Notice: Subject to any disclaimer, the term of this patent is extended or adjusted under 35 U.S.C. 154(b) by 0 days.

(21) Appl. No.: 10/507,976

(22) PCT Filed: Jun. 22, 2004

(86) PCT No.: PCT/KR2004/001502

§ 371 (c)(1),
(2), (4) Date: Sep. 15, 2004

(87) PCT Pub. No.: WO2004/113797

PCT Pub. Date: Dec. 29, 2004

(65) Prior Publication Data

US 2005/0169616 A1 Aug. 4, 2005

(30) Foreign Application Priority Data

Jun. 23, 2003 (KR) .................. 10-2003-0040638
May 10, 2004 (KR) .................. 10-2004-0032571

(51) Int. Cl.
*F24H 1/20* (2006.01)

(52) U.S. Cl. ........................... 392/457; 165/165
(58) Field of Classification Search ........ 392/470–471; 165/165–175
See application file for complete search history.

(56) References Cited

U.S. PATENT DOCUMENTS

| 4,524,757 A | * | 6/1985 | Buckley ............... 126/624 |
| 4,600,053 A | * | 7/1986 | Patel et al. ............ 165/170 |
| 5,080,166 A | | 1/1992 | Haugeneder ........... 165/56 |

FOREIGN PATENT DOCUMENTS

| JP | 51-69458 | 6/1976 |
| KR | 1995-0006363 | 3/1995 |
| KR | 2002-0095733 | 12/2002 |

* cited by examiner

*Primary Examiner*—Thor S. Campbell
(74) *Attorney, Agent, or Firm*—Cantor Colburn L.L.P.

(57) ABSTRACT

Disclosed herein is a heating system of floating floor structure including a heating panel with a circular or elliptical inner fluid pathway. The heating panel having the circular or elliptical inner fluid pathway overcomes limitation on pressure resistance, which is the problem of the convention heating panel having a hexagonal fluid pathway, thereby providing enhanced pressure resistance. Furthermore, a floating floor structure of the heating system enhances thermal efficiency, and effectively improves sound absorbing/dampening function in a floor of a building. Additionally, the floating floor structure is provided with inner spaces, which allow utility equipment, such as an electric wire or a pipe, to be easily established therein, thereby enabling an easy repair of the heating system and the utility equipment.

11 Claims, 7 Drawing Sheets

HEATING SYSTEM OF FLOATING STRUCTURE INCLUDING HEATING PANEL HAVING ROUND TO ELLIPTIC INNER FLUID PATHWAY

TECHNICAL FIELD

The present invention relates to a heating system of a floating floor structure including a heating panel with a circular or elliptical inner fluid pathway, and more particularly to a heating system, which includes a plate heating panel having a circular or elliptical inner fluid pathway formed therein, in a floating floor structure, thereby enhancing pressure resistance, sound absorbing and heat insulating functions.

BACKGROUND ART

Generally, a heating system, having been applied to residential buildings, such as houses, villas, and apartments, employs a structure involving a wet heating process, in which a pipe is laid under a flooring material of a room in a building and supplied with heating fluid, such as heating water, thereby heating the room of the building. FIG. 13 is a cross sectional view of a so-called wet type ondol heating system of a conventional technique ("ondol" is a Korean traditional floor-embedded heating system).

As shown in FIG. 13, the wet type ondol heating system 1' according to the conventional technique comprises a heat insulating layer 18' formed on a slab 26, a porous concrete layer 16 formed on the heat insulating layer 18', a pipe 13 in a predetermined shape formed on the porous concrete layer 16, and a mortar layer 14 formed on the porous concrete layer 16 such that the pipe 13 is completely covered with the mortar layer. 14, on which a finishing material 22 is provided, completing a floor structure of the room of the building.

Here, the wet type ondol heating system 1' shown in FIG. 13 has a structure wherein the porous concrete layer 16 is formed with an air layer therein, so that the air layer absorbs noise or vibration transmitted to the slab layer 26 and prevents heat in the pipe 13 from being transmitted in a direction of the slab layer 26 when the pipe 13 is supplied with heating water, leading to reduction in thermal loss, and wherein the heat insulating layer formed under the porous concrete layer 16 also prevents thermal loss from the pipe 13.

In the above structure of the heating system, it is desirable that the porous concrete layer 16 has a sufficient thickness. Accordingly, in most cases, the heat insulating layer 18' has a thickness of 20 mm, the porous concrete layer 16 has a thickness of 70 mm, and the mortar layer 14 has a thickness of 30 to 40 mm. As a result, the conventional ondol heating system has a total thickness of approximately 120 to 130 mm from the slab layer 26 to the finishing material 22.

Accordingly, the conventional ondol heating system has problems due to the structure thereof as follows.

First, due to poor heat insulating effect of the porous concrete layer 16 and the heat insulating layer 18', the conventional heating system has a low thermal efficiency. For instance, in the structure of the heating system shown in FIG. 13, the heating water having a temperature of about 70~80° C. must be supplied from a heating water supplier to the heating system in order to heat the floor surface of the room to a temperature of about 30° C., leading to a large thermal loss. Therefore, the conventional heating system is disadvantageous in view of energy consumption.

Second, since the noise and vibration cannot be effectively prevented from being transmitted to an upper portion only with the porous concrete layer 16, the conventional heating system is weak in sound absorbing function, and thus, it cannot satisfy sound absorbing requirements for residential constructions, particularly, such as apartments.

Third, since the porous concrete layer 16 and the mortar layer 14 are formed on the entire floor surface, construction time is extended by a time required for curing cement. Furthermore, when there occurs a problem in the pipe 13, such as a water leakage, the mortar layer 14 must be broken in order to repair the pipe 13, thereby making it difficult to repair the heating system, and requiring a large expenditure for repairs.

In order to solve the problems of the conventional heating system as described above, a dry type heating panel made of concrete, synthetic resin, or yellow clay, which is embedded with a pipe for carrying heating water therein, or which is provided with grooves or fixing members for installing the pipe for carrying heating water, was developed. The dry type heating panel is an assembly type heating panel, and has advantageous effects in that the construction of the heating system may be completed by simply assembling previously produced dry type panels, thereby reducing the construction time, and simplifying maintenance and repair operations thereof. However, the dry type heating panel has problems in that since it adopts a line heating structure in which radiation heat is mainly concentrated where the pipe for carrying heating water is located, generating a severe temperature variation in the heating system, the dry type heating panel is ineffective in view of heating efficiency, and in that since the pipe itself is made of metal or synthetic resin, it is expensive, resulting in increased construction costs. Furthermore, thermal loss may occur due to piping, and dewing phenomenon may occur on the surface of the pipe, thereby wetting the panel.

In order to solve the problems of the conventional dry type heating panel described above, as disclosed in U.S. Pat. No. 5,080,166 and Korean Patent Laid-open publication No. 2002-95733, a plate type heating panel provided with an inner fluid pathway for allowing the heating water to flow therethrough was developed. Compared with the dry type heating system adopting the line heating structure, the plate type heating panel having the inner fluid pathway therein adopts a plane heating structure in which the heating water flows not in a local area but in an overall area, so that it has very high heating efficiency, resulting in reduction of fuel expenses, and so that the pipe is not required for the structure of the plate type heating panel, thereby eliminating a complicated piping work and reducing the expenses for piping. Additionally, the plate type heating panel is not subject to the thermal loss and the dewing phenomenon, which usually occurs on the surface of the pipe in the structure of the dry type heating panel, and allows a weight of the panel to be reduced. Furthermore, the plate type heating panel is very easy to construct and repair.

However, as shown in FIG. 2, a conventional plate type heating panel 2' having the inner fluid pathway has a disadvantage in that since the inner fluid pathway 12' has a hexagonal shape, it is structurally very weak at an angled portion of the hexagonal shape. Furthermore, compared with an individual heating system in which the heating fluid has a water pressure of 3.5 kgf/cm² or less as a maximum value, in case of a central heating or a district(regional) heating, the heating fluid has a water pressure of about 6 to 7 kgf/cm² as a maximum value, and may have a local water pressure over 6 to 7 kgf/cm² due to a site or height of the building.

Accordingly, when installing the inner fluid pathway-embedded heating panel in the central heating or in the district heating, a pressure resistance of the heating panel must be considered in order to prevent a deformation or leakage of the panel, which may be caused by the water pressure condition as mentioned above.

Japanese Utility Model Laid-open Publication No. (Sho) 51-69458 discloses a bottom heating type panel using heating water, which comprises a heat insulating bottom panel with zigzag-shaped grooves formed thereon, a pipe for carrying heating water fixed to the zigzag-shaped grooves, and a metal plate for heat radiation formed on the heat insulating bottom panel while contacting the pipe for carrying heating water. However, since the bottom heating type panel employs the line heating structure, it has a low thermal efficiency, and regardless of double floors in a floating structure, it has a low sound absorbing performance due to absence of sound absorbing/vibration isolating layers.

Korean Patent Laid-open Publication No. 1995-6363 discloses an assembly type ondol plate having an inner heating water pathway. However, the inner heating water pathway of the ondol plate also has a hexagonal shape, and thus it is structurally very weak at an angled portion of the hexagonal shaped inner heating water pathway.

DISCLOSURE

Technical Problem

Therefore, the present invention has been made in view of the above problems, and it is an object of the present invention to provide a plate type heating panel, which has an circular or elliptical inner fluid pathway formed therein, thereby enhancing pressure resistance.

It is another object of the present invention to provide a dry type heating system, which employs the heating panel with the circular or elliptical inner fluid pathway formed therein, without using a cement layer, such as a porous concrete layer or a mortar layer of the wet ondol heating system, thereby enabling easy construction and repair of the heating system, realizing an improved heat insulating effect, thereby leading to enhancing thermal efficiency of the heating system, and enhancing sound absorbing/dampening effects.

Technical Solution

In accordance with an aspect of the present invention, the above and other objects can be accomplished by the provision of a heating panel, comprising upper and lower plates integrally formed to face each other so as to form an inner fluid pathway in which heating water flows; a plurality of connecting members, each symmetrically extending from the upper and lower plates toward the lower and upper plates, respectively, and connecting the upper and lower plates to each other; an inner fluid pathway formed at an inside of the plate by the plurality of connecting members; and two fluid communication portions for supplying and discharging the heating water, wherein each of the connecting members extends at a sloping angle, such that upper and lower sides of the connecting member, facing each other while symmetrically extending from the upper and lower plates, respectively, converge to a bottom plane located at the center of the connecting member, and is defined with a circular or elliptical shape, respectively, at upper and lower portions of the connecting member where the connecting member starts to extend from the upper and lower plates, forming a circular or elliptical inner fluid pathway in the heating panel.

Each of the connection members may be defined with a groove by being extended toward the upper and lower plates from a periphery of the bottom plane of the connecting member, deviated from the center of the bottom plane of the connecting member, where the upper and lower plates are connected.

In order to realize the inner fluid pathway having the circular or elliptical shape along respective sides of each of the heating panel, the heating panel may comprise protrusive panel connecting portions at respective sides of each of the upper and lower plates, and grooves at portions adjacent to the inner fluid pathway of the protrusive panel connecting portions, for connecting the heating panels.

In accordance with another aspect of the present invention, there is provided a heating system, comprising: a floating floor structure disposed at a predetermined thickness above a slab and having inner spaces uniformly arranged to face to the slab; a thermal insulating layer formed on the floating floor structure; and a heating panel, the heating panel including: upper and lower plates integrally formed to face each other so as to form an inner fluid pathway in which heating water flows; a plurality of connecting members, each symmetrically extending from the upper and lower plates toward the lower and upper plates, respectively, and connecting the upper and lower plates to each other; an inner fluid pathway formed at an inside of the plate by the plurality of connecting members; and two fluid communication portions for supplying and discharging the heating water, wherein each of the connecting members extends at a sloping angle, such that upper and lower sides of the connecting member, facing each other while symmetrically extending from the upper and lower plates, respectively, converge to a bottom plane located at the center of the connecting member, and is defined with a circular or elliptical shape, respectively, at upper and lower portions of the connecting member where the connecting member starts to extend from the upper and lower plates, forming a circular or elliptical inner fluid pathway in the heating panel.

In order to satisfy sound absorbing requirements for residential constructions, particularly, such as apartments, the heating system may further comprise a sound absorbing/dampening layer formed between the floating floor structure and the slab.

In order to increase thermal conductivity of the heating panel, the heating system may further comprise a metal plate of high thermal conductivity disposed on the heating panel. The metal plate may be made of aluminum coated steel plate.

The floating floor structure may comprise a plurality of supporting members spaced a predetermined distance from each other on the slab, and a plate member provided on the supporting members.

The plate member may be made of a wooden material. The plate member may be made of a polymer resinous panel including sheet molding compound (SMC). The supporting members may be fastened to the plate member with screws such that a height of the plate member above the slab may be adjusted.

The floating floor structure may comprise Styrofoam plate regularly defined with inner spaces at one side thereof facing the slab.

The floating floor structure with the inner space of the present invention enhances a sound absorbing/dampening function using the floating floor structure with the inner spaces, and the metal plate of the present invention improves thermal conductivity. Furthermore, the floating floor structure of the present invention allows utility equipment, such as an electric wire or a pipe, to be easily established therein, thereby enabling easy repair of the heating system and the utility equipment.

ADVANTAGEOUS EFFECTS

As such, since the heating panel according to the present invention is designed to have the circular or elliptical inner fluid pathway, the heating panel of the present invention overcomes a limitation on pressure resistance, which is the problem of the convention heating panel having the hexagonal fluid pathway, thereby providing enhanced pressure resistance, and can be more stably applicable to the district and central heating system in which the heating water is supplied at a high water pressure.

Furthermore, the floating floor structure of the heating system according to the present invention enhances the thermal efficiency, and effectively improves the sound absorbing/dampening function in the floor of the building. Additionally, the floating floor structure of the present invention is provided with the inner spaces, which allow utility equipment, such as an electric wire or a pipe, to be easily installed therein, thereby enabling an easy repair of the heating system and the utility equipment without breaking a concrete layer.

DESCRIPTION OF THE DRAWINGS

The above and other objects, features and other advantages of the present invention will be more clearly understood from the following detailed description taken in conjunction with the accompanying drawings, in which.

BEST MODE

Preferred embodiments of the present invention will be described in detail with reference to the drawings.

Figure 1:
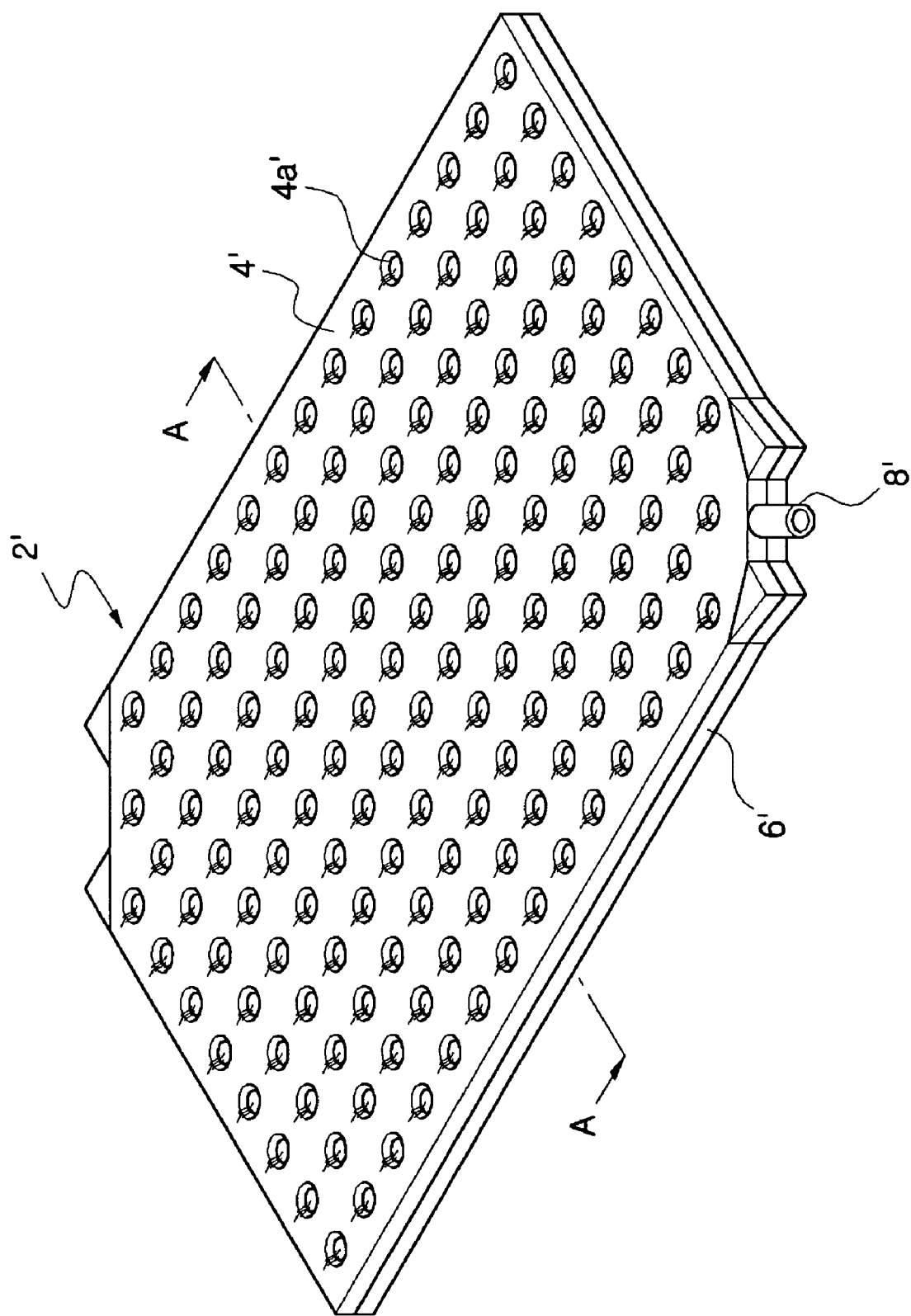
FIG. 1 is a perspective view illustrating a conventional plate type heating panel having an inner fluid pathway.

FIG. 1 is a perspective view illustrating a conventional plate type heating panel having an inner fluid pathway. In FIG. 1, a heating panel 2' comprises upper and lower plates 4' and 6' integrally formed to face each other, forming an inner fluid pathway 12', in which heating fluid flows, between the plates 4' and 6'. The heating panel 2' is made of a thermoplastic material in order to allow easy manufacturing and forming, and has a flat plate shape in order to cover a maximum area of a floor (it is also applicable to a wall or a ceiling) of a room such that the heating water may contact the floor of the room over a larger area.

In FIG. 1, the heating panel 2' has a rectangular structure with a pair of long sides and a pair of short sides. However, for an easier continuous arrangement of the heating panels in construction of the heating system, the heating panel 2' may have a polygonal structure, such as a hexagonal shape or an octagonal shape.

The heating panel 2' is integrally formed with two fluid communication portions 8' for supplying and discharging the heating water at two corners of the heating panel 2' opposite to each other in a diagonal direction, respectively. The fluid communication portions 8' are connected to other fluid communication portions of another heating panel by additional connecting members.

Figure 2:
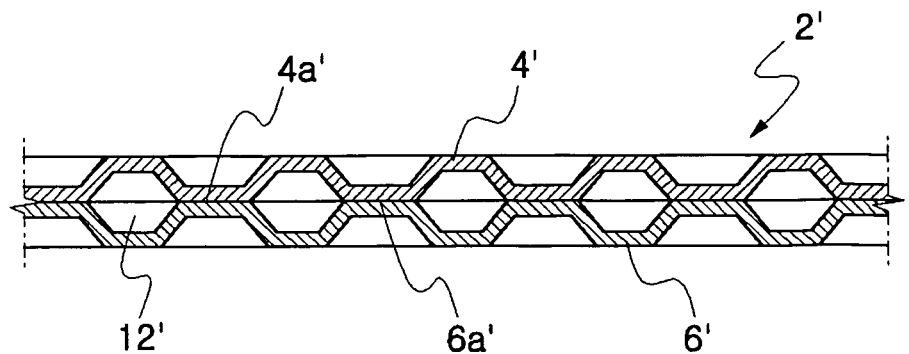
FIG. 2 is a cross sectional view taken along line A—A of FIG. 1, illustrating the shape of the inner fluid pathway of the conventional plate type heating panel.

FIG. 2 is a cross sectional view taken along line A—A of FIG. 1, which illustrate the shape of the inner fluid pathway of the conventional plate type heating panel. As shown in FIG. 2, the upper and lower plates 4' and 6' are provided with a plurality of connecting members 4a' and 6a' and an inner fluid pathway 12'. Among the connecting members 4a' and 6a' consisting of upper connecting members 4a' and lower connecting members 6a', each of the upper connecting members 4a' extends from the upper plate 4' to the lower plate 6' and each of the lower connecting members 6a' extends from the lower plate 6' to the upper plate 4' such that the upper and lower connecting members 4a' and 6a' symmetrically extend to each other, connecting the upper and lower plates.

The connecting members 4a' and 6a' serve not only to prevent the upper and lower plates 4' and 6' from being deformed due to an external force while supporting the upper and lower plates 4' and 6', but also to define the inner fluid pathway for allowing the heating water to flow therein while imposing resistance on flow of the heating fluid in order that the heating water may be uniformly distributed in the panel without being concentrated or retarded at a specific portion of the heating panel 2'.

As shown in FIG. 2, in the conventional heating panel 2', the inner fluid pathway defined in the upper and lower plates 4' and 6' by the upper and lower connecting members 4a' and 6a' has a hexagonal shaped cross section, so that it is structurally very weak at an angled portion thereof. As a result, in a case where the heating fluid supplied to the heating panel has a high water pressure, if stress is concentrated at the weak angled portion of the connecting portions 4a' and 6a', and then reaches to a critical point, causing deformation of the heating panel 2', leakage of the heating water from the heating panel 2', or breakage of the heating panel 2' may result.

Figure 3:
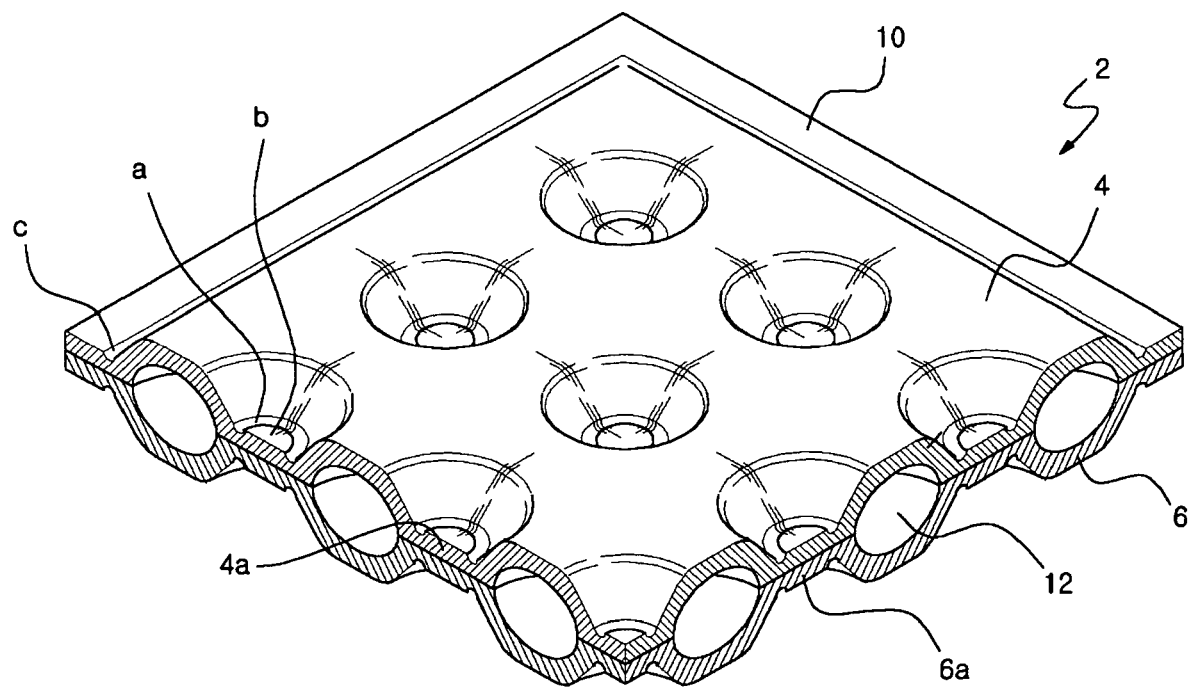
FIG. 3 is a perspective view illustrating a plate type heating panel having a circular shaped inner fluid pathway according to one embodiment of the present invention.
Figure 4:
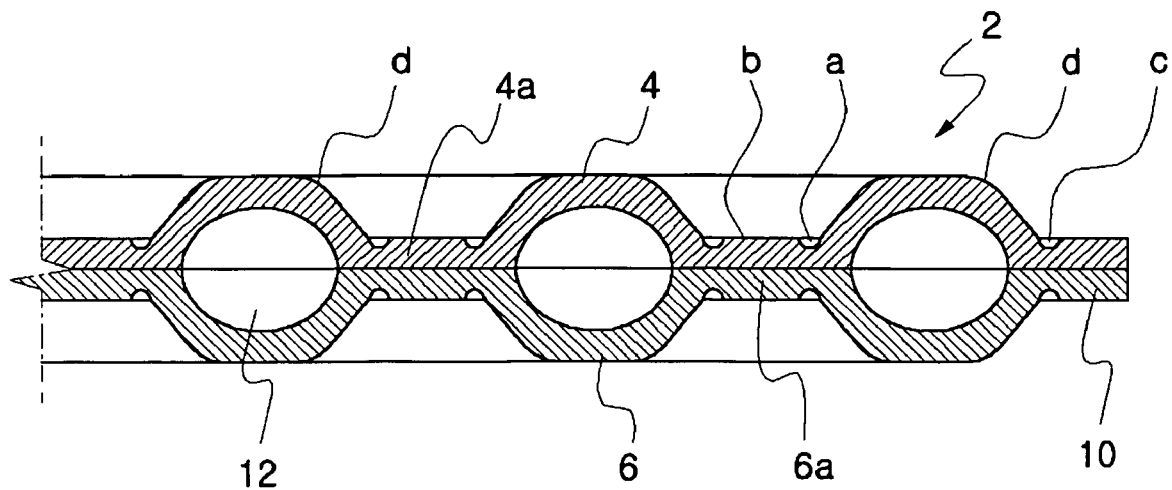
FIG. 4 is a cross sectional view illustrating the plate type heating panel having the circular shaped inner fluid pathway according to the embodiment of the present invention.
Figure 5:
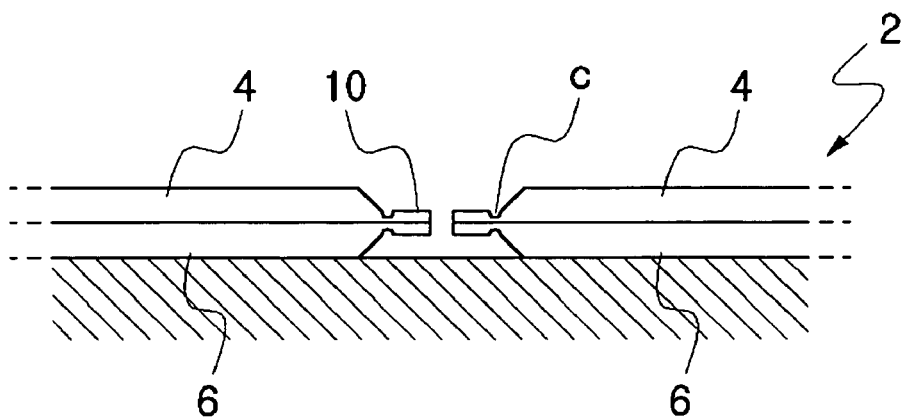
FIG. 5 is a cross sectional view illustrating a protrusive panel connecting portion of the heating panel according to the embodiment of the present invention.
Figure 6:
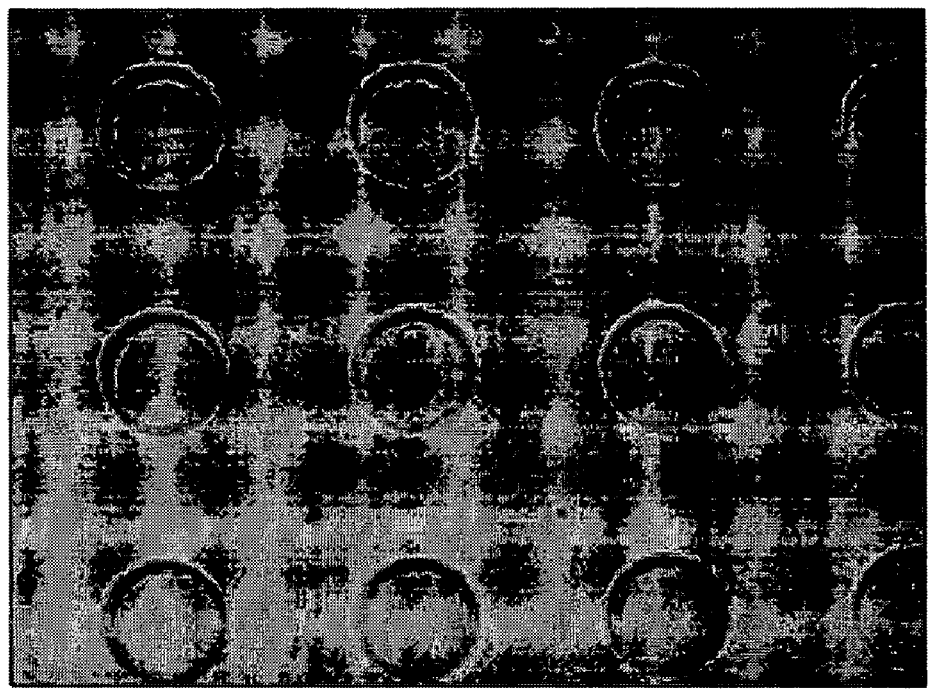
FIG. 6 is a plane view illustrating the conventional plate type heating panel having an inner fluid pathway.
Figure 7:
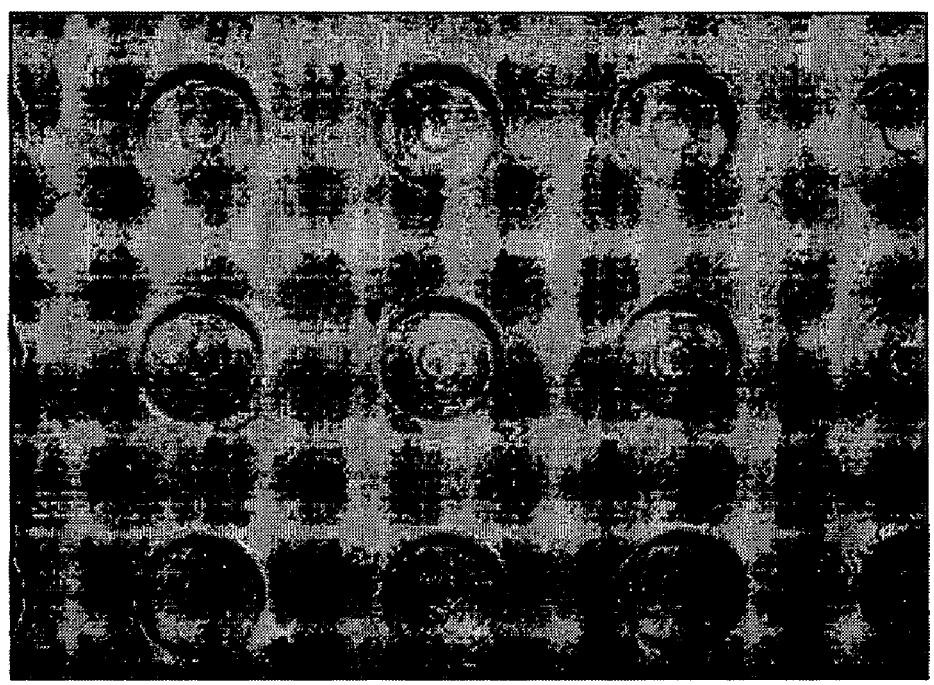
FIG. 7 is a plane view illustrating the plate type heating panel having the circular shaped inner fluid pathway according to one embodiment of the present invention.

FIGS. 3 to 5 are perspective views illustrating a heating panel 2 according to one embodiment of the present invention, which overcomes the problems of the conventional heating panel 2' as described above, and which has remarkably enhanced pressure resistance by forming the inner fluid pathway to have a substantially circular shape.

As shown in FIGS. 3 and 4, a heating panel 2 according to one embodiment of the present invention has a substantially circular inner fluid pathway 12. In order to define the substantially circular inner fluid pathway 12, upper and lower connecting members 4a and 6a extend at a sloping angle such that an upper side of the upper connecting member 4a and a lower side of the lower connecting member 6a, facing each other, converge to a bottom plane located at the center of the upper and lower connecting members 4a and 6a. Additionally, the upper and lower connecting members 4a and 6a are rounded to have a substantially circular shape, respectively, at an upper portion d of the upper connecting member 4a and at a lower portion d' (not shown in the figures) of the lower connecting member 6a, where the upper and lower connecting members 4a and 6a start to extend from the upper and lower plates 4 and 6, respectively. Furthermore, the upper and lower connection members 4a and 6a are formed with grooves, respectively, by being extended toward the upper and lower plates 4 and 6 from a periphery a of the bottom plane of the connecting members 4a and 6a, deviated from the center b of the bottom plane of the connecting member, where the upper and lower plates are connected.

As for a molding method of manufacturing the heating panel 2 according to the present invention, although an injection molding, an extrusion molding, and the like can be used, a blow molding is preferably used for manufacturing the heating panel 2. The blow molding is a molding method which forms a hollow product by blowing air into a separating mold, in which molten thermoplastic forming material is inserted and then softened with heat.

As shown in the drawings, although the upper and lower connecting members 4a and 6a preferably have a circular cross section, they may also have a polygonal cross section, such as a rectangular cross section, a hexagonal cross section, and the like. Accordingly, a shape of the grooves at the periphery a and c or a shape at the rounded portions d and d' for defining the substantially circular inner fluid pathway may be varied depending on a three dimensional configuration defined by the upper and lower connecting members 4a and 6a.

The upper and lower connecting members 4a and 6a have cylindrical shaped negative angle structures, spaced a predetermined distance from each other in a predetermined pattern. The cylindrical shaped negative angle structures extend to the upper and lower plate 4 and 6, and have a diameter gradually decreasing from the upper and lower plate 4 and 6 to the bottom plane located at the center of the connecting members 4a and 6a.

Although the heating panel 2 of the present invention is integrally formed with the upper and lower plates 4 and 6, for convenience of description, the heating panel 2 is divided into the upper and lower plates 4 and 6, and the upper and lower connecting members 4a and 6a, centered on a central axis of the cross section in the horizontal direction. Furthermore, as the connecting members 4a and 6a extend from the upper and lower plates 4 and 6, respectively, borders of the upper and lower connecting members 4a and 6a will be defined from upper and lower portions d and d', where the upper and lower connecting members 4a and 6a start to extend from the upper and lower plates 4 and 6, to the bottom plane b of the upper and lower connecting members 4a and 6a, where the upper and lower connecting members 4a and 6a contact each other, connecting the upper and lower plates 4 and 6.

Unlike the conventional heating panel 2' having the angled portions to the upper and lower plates 4' and 6', according to one embodiment of the present invention, the upper and lower portions d and d', where the upper and lower connecting members 4a and 6a start to extend from the upper and lower plates 4 and 6, are rounded in order to make upper and lower portions of the inner fluid pathway 12 to have a circular or elliptical shape. As a result, the upper and lower portions of the inner fluid corresponding to the upper and lower portions of the connecting members 4a and 6a, which extend from the upper and lower plate 4 and 6, are made to have the circular or elliptical shape.

As can be appreciated from the three dimensional configuration shown in FIG. 3, the upper and lower connecting portions 4a and 6a extend at a gentle slope at the upper and lower portions d and d' starting to extend from the upper and lower plates 4 and 6 while extending with a steep slope, at an angle larger than that of the upper and lower portions d and d', at the periphery a of the bottom plane where the upper and lower connecting members 4a and 6a contact each other.

Furthermore, according to the embodiment of the present invention, in order to make both sides of the inner fluid pathway 12 to have a circular or elliptical shape, the upper and lower connecting members 4a and 6a are formed with a groove structure, in which the upper and lower connecting members 4a and 6a are depressed at the circular-shaped periphery a of the bottom plane b of the connecting member 4a and 6a, respectively. As a result, the inner fluid pathway 12, corresponding to the circular shaped periphery a of the connecting members 4a and 6a, has the circular or elliptical shape at both sides of the inner fluid pathway.

As shown in FIG. 3, since the groove structure provides a donut-shaped circular groove at the circular-shaped periphery a of the bottom plane b of the upper and lower connecting members 4 and 6, the central portion of the bottom plane looks like a cylindrical protrusion.

The groove defined at the periphery a of the bottom plane b is not specifically restricted in inner and outer diameters, depth, width, and cross sectional shape described above, under the condition that the groove structure allows the inner fluid pathway 12 to have the substantially circular or elliptical-shaped structure without damaging structural and functional stability of the heating panel 2.

Furthermore, as shown in FIG. 5, according to the present invention, in order to fasten the heating panels 2 to each other using separate fastening members, the heating panel 2 is formed with protrusive panel connecting portions 10 at four sides of the heating panel 2, and each of the protrusive panel connecting portions 10 is formed with a straight groove c in which a portion adjacent to the inner fluid pathway 12 is depressed, so that the inner fluid pathway 12 can be formed to have the circular and elliptical shape at the sides of the heating panel 2.

The groove structure of the portion "c" corresponds to that of the portion "a" (FIG. 4), and may be varied according to the shape and the structure of the sides of the heating panel 12.

Although in the preferred embodiment of the present invention shown in FIGS. 3 to 5, the rounded portions d and d' and the groove structure a, b, and c are applied to the heating panel, it should be understood that either the rounded portions d and d' or the groove structures a, b, and c are also applied to the heating panel. However, since the inner fluid pathway is closer to the circular shape when applying both the rounded portions d and d' and the groove structures a, b, and c to the heating panel, it is desirable that both structures are applied to the heating panel.

Pressure resistances of a heating panel having the inner fluid pathway to which only the rounded portions d and d' are applied (Inventive Example 1), a heating panel having the inner fluid pathway to which the groove structure a, b and c is applied (Inventive Example 2), the heating panel having the inner fluid pathway to which both the rounded portions d and d' and the groove structure are applied at the same time (Inventive Example 3), and a conventional heating panel having the hexagonal inner fluid pathway (Comparative Example) were measured, the results of which are shown in Table 1 as follows.

TABLE 1

| | Example No. | | | |
|---|---|---|---|---|
| | Inventive Example 1 | Inventive Example 2 | Inventive Example 3 | Comparative Example |
| Pressure resistance | 20 kgf/cm$^2$ | 20 kgf/cm$^2$ | 30 kgf/cm$^2$ | 15 kgf/cm$^2$ |

[Note]
Pressure resistance was measured as a critical water pressure when there occurs deformation or leakage in the heating panel (pressure resistance at room temperature).

As shown in Table 1, it can be appreciated that the heating panel to which the rounded portions d and d' are applied (Inventive Example 1) and the heating panel to which the groove structures a, b and c are applied (Inventive Example 2) have a pressure resistance 33% greater than that of the conventional heating panel. Particularly, it can be appreciated that the heating panel to which both the rounded portions and the groove structure are applied (Inventive Example 3) has a pressure resistance 100% greater than that of the conventional heating panel, that is, two times more than that of the conventional heating panel.

In the drawings, although the heating panel having the substantially circular shaped inner fluid pathway according to the present invention is illustrated, according to the present invention, a heating panel having a completely circular shaped inner fluid pathway can also be utilized.

Specifically, the inner fluid pathway can be formed to have the completely circular shape by making the groove at the periphery a of the connection members and the groove c of the panel connecting portions 10 to be deeper, by increasing a rake angle of the upper and lower portions d and d' to have the circular shape, and by adjusting the distance between the connecting members. As with making the inner fluid pathway to have the completely circular shape, the heating panel has a more enhanced pressure resistance than that of the heating panel having the substantially circular-shaped inner fluid pathway.

Figure 8:
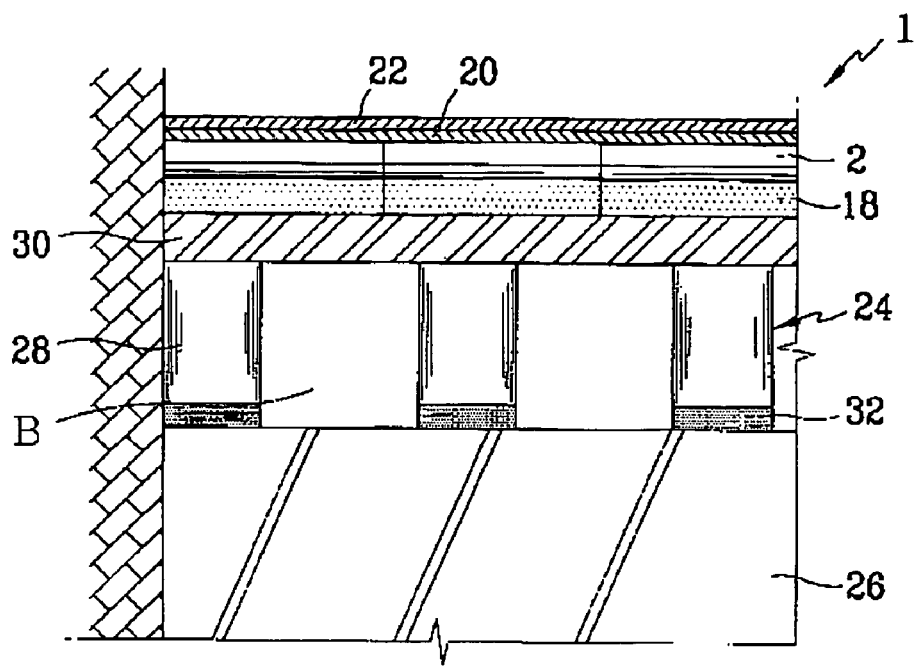
FIG. 8 is a cross sectional view illustrating a heating system according to a first embodiment of the present invention.

FIG. 8 is a cross sectional view illustrating a heating system according to a first embodiment of the present invention. As shown in the drawings, a heating system 1 is formed at a lower portion of the heating panel 2 with a thermal insulating layer 18 made of EPS (Expanded Polystyrene) to minimize thermal loss, and provided with a metal plate 20 and a finishing material 22 on the heating panel 2.

The metal plate 20 is made of steel plate, more preferably aluminum coated steel plate, both of which have a high thermal conductivity. Accordingly, an excellent thermal conductivity of the metal plate 20 improves a heat conducting function of the heating panel 2, enhancing the heating efficiency. Furthermore, the metal plate 20 strengthens the heating panel 2, more securely supporting a load applied to the bottom of a building, and uniformly covers an uneven surface of the heating panel, enabling the finishing material 22 to be more easily installed.

According to a result of an experiment, the structure of the heating panel 2 provided between the thermal insulating layer 18 and the metal plate 20 provides an effect of heating the floor surface of the building to a temperature of 30° C. even with heating water of approximately 40~50° C. supplied from a heating water supplier, not shown. Accordingly, the heating system of the present invention has an enhanced thermal efficiency compared with the conventional pipe heating system.

Meanwhile, the heating panel 2 and the thermal insulating layer 18 have a total thickness of approximately 40 mm. Accordingly, compared with the conventional pipe heating system having a thickness of about 120~130 mm, an allowance space of 80~90 mm is provided.

In order to maximize utility of the allowance space, the heating system according to the present invention is formed with a so-called floating floor structure having inner spaces regularly disposed in the allowance space of the heating system 1.

As shown in FIG. 8, a floating floor structure 24 of a heating system according to the first embodiment of the present invention comprises a plurality of supporting members 28 spaced a predetermined distance from each other, and a plate member 30 established on the supporting member 28 to be parallel to the heating panel 2.

In the first embodiment of the present invention, the supporting members 28 and the plate member 30 are made of a wooden material. Meanwhile, a sound absorbing/dampening layer 32, having a form of, for example, a sound absorbing pad, a rubber packing and the like, is formed between each of the supporting members 28 and a slab 26, allowing the supporting members 28 to be securely fixed to the slab 26, and enhancing sound absorbing and dampening functions.

As a result, as shown in the drawings, the floating floor structure 24 of the heating system 1 is provided with inner spaces B between the plurality of supporting members 28, so that the inner spaces B absorb noise and vibration generated above the floating floor structure 24, reducing an amount of the noise and vibration transmitted to the slab 26. Furthermore, the sound absorbing/dampening layer 32 provided between each of the supporting members 28 and the slab 26 can effectively dampen the noise and vibration, which is transmitted to the slab 26 through the supporting members 28.

Accordingly, the floating floor structure 24 of the heating system of the first embodiment enhances the sound absorbing and dampening functions, and allows utility equipment, such as an electrical wire or a pipe, which has been provided between walls of the building in construction of the building in the prior art, to be provided in the inner spaces B, thereby enabling an easy repair of the heating system and the utility equipment without breaking a concrete layer.

Figure 9:
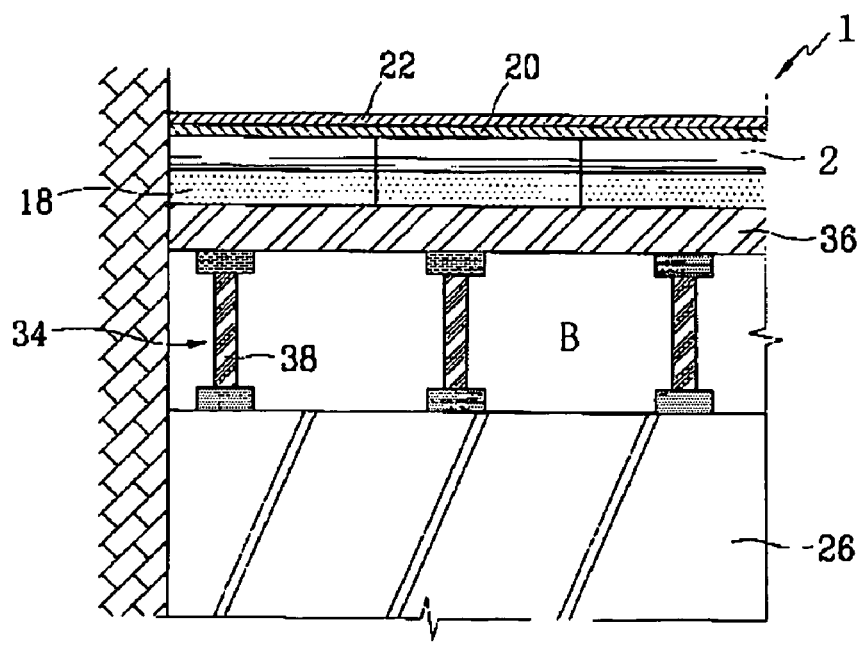
FIG. 9 is a cross sectional view illustrating a heating system according to a second embodiment of the present invention.
Figure 10:
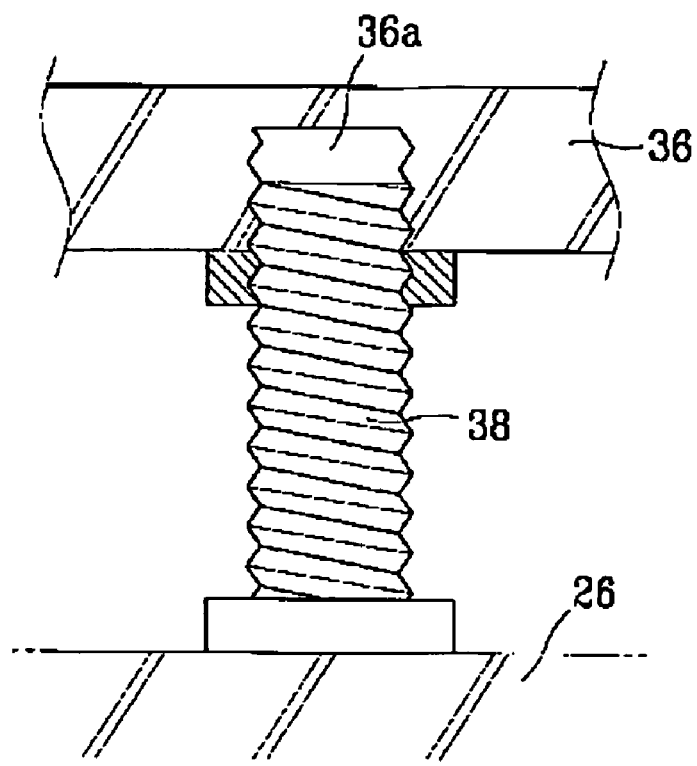
FIG. 10 is a partially exploded view illustrating a coupled state of a supporting member and a plate member of FIG. 9.

FIG. 9 is a cross sectional view illustrating a heating system according to a second embodiment of the present invention, and FIG. 10 is a partially exploded view illustrating a coupled state of the supporting members and the plate member.

A floating floor structure 34 of the heating system according to the second embodiment comprises a plate member 36 made of a polymeric resinous panel, such as sheet molding compound (SMC), as well as the wooden material, and a plurality of supporting members 38 clamped to the plate member 36 with screws such that a height of the plate member 36 to the slab 26 can be adjusted.

That is, as shown in FIG. 10, each of the supporting members 38 is formed with threads on an outer periphery thereof, and the plate member 36 coupled to the supporting members 38 is formed with grooves 36a to which the supporting members 38 are fastened. Furthermore, each of the grooves 36a is formed at an inner surface thereof with threads engaged with the threads of each of the supporting members 38.

Figure 11:
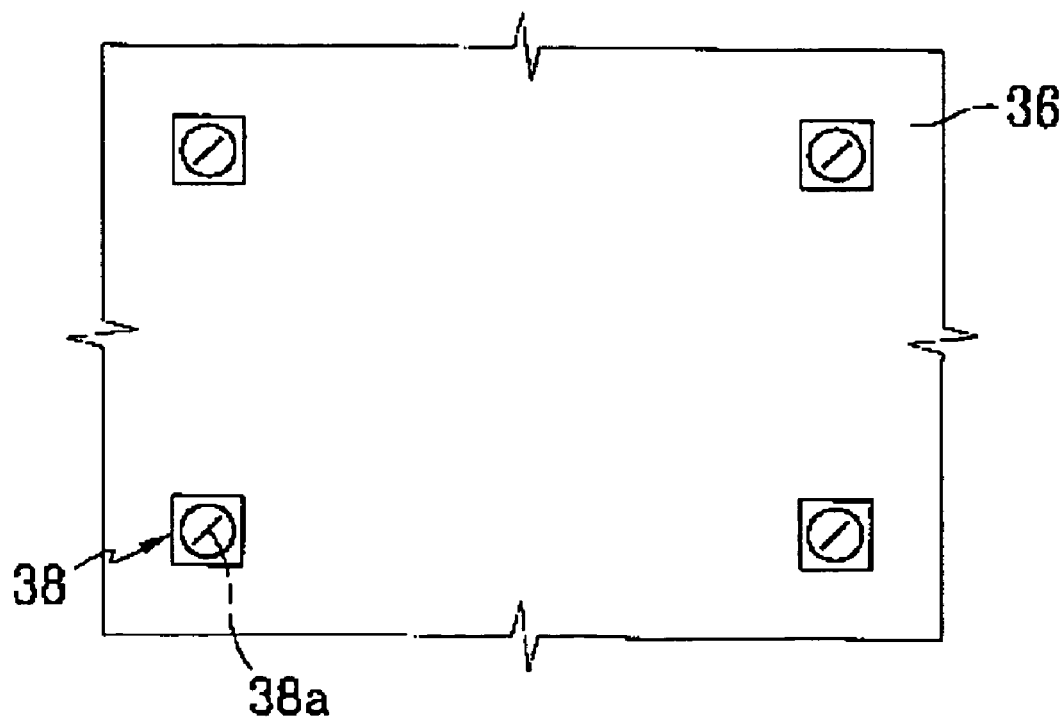
FIG. 11 is a bottom view illustrating the supporting member and the plate member of FIG. 9.

FIG. 11 is a bottom view illustrating the supporting members 38 and the plate member shown in FIG. 9. In FIG. 4, each of the supporting members 38 is formed at the bottom end thereof with a screw head groove 38a enabling the supporting member 38 to rotate, thereby enabling an easy adjustment of a distance between the plate 36 and the slab 26 at a desired thickness by rotating the supporting members 38.

Figure 12:
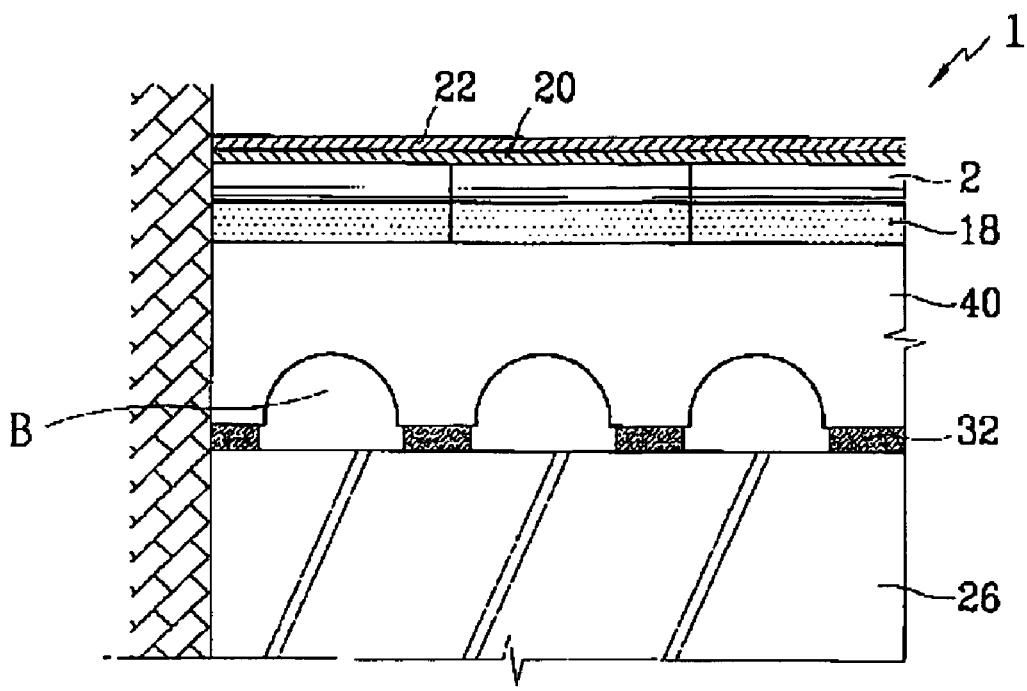
FIG. 12 is a cross sectional view illustrating a heating system according to a third embodiment of the present invention.
Figure 13:
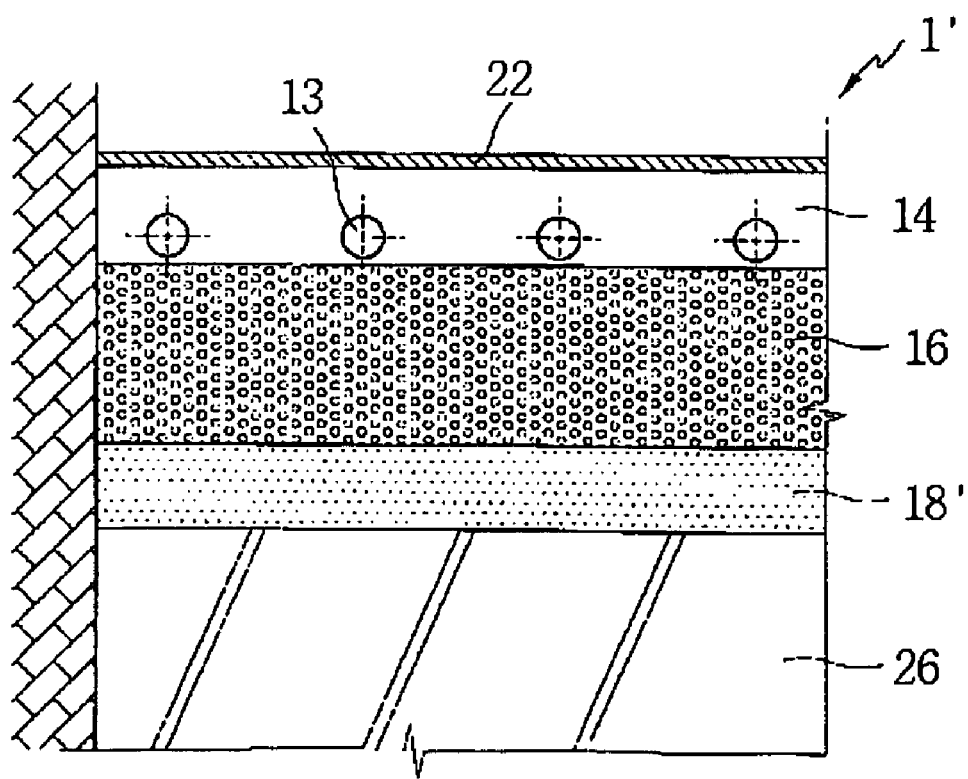
FIG. 13 is a cross sectional view of a so-called wet type ondol heating system of a conventional technique.

FIG. 12 is a cross sectional view illustrating a heating system according to a third embodiment of the present invention. A floating floor structure of the heating system according to the third embodiment comprises Styrofoam plate 40, which is regularly formed with inner spaces B at one side thereof facing a slab 26. The Styrofoam plate 40 reinforces a thermal insulating function of a thermal insulating layer 18, thereby more effectively reducing thermal loss of the heating panel 2, compared with the structure of the embodiments described above.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A heating panel, comprising: upper and lower plates integrally formed to face each other so as to form an inner fluid pathway in which heating water flows; a plurality of connecting members, each symmetrically extending from the upper and lower plates toward the lower and upper plates, respectively, and connecting the upper and lower plates to each other; an inner fluid pathway formed at an inside of the plate by the plurality of connecting members; and two fluid communication portions for supplying and discharging the heating water, wherein each of the connecting members extends at a sloping angle, such that upper and lower sides of the connecting member, facing each other while symmetrically extending from the upper and lower plates, respectively, converge to a bottom plane located at the center of the connecting member, and is defined with a circular or elliptical shape, respectively, at upper and lower portions of the connecting member where the connecting member starts to extend from the upper and lower plates, forming a circular or elliptical inner fluid pathway in the heating panel, wherein each of the connection members is defined with a groove by being extended toward the upper and lower plates from a periphery of the bottom plane of the connecting member, deviated from the center of the bottom plane of the connecting member, where the upper and lower plates are connected.

2. The heating panel as set forth in claim 1, wherein the heating panel comprises protrusive panel connecting portions at respective sides of each of the upper and lower plates, and grooves at portions adjacent to the inner fluid pathway of the protrusive panel connecting portions, for connecting the heating panels.

3. A heating system, comprising:
a floating floor structure disposed at a predetermined thickness above a slab and having inner spaces uniformly arranged to face to the slab;
a thermal insulating layer formed on the floating floor structure; and
a heating panel, the heating panel including: upper and lower plates integrally formed to face each other so as to form an inner fluid pathway in which heating water flows; a plurality of connecting members, each symmetrically extending from the upper and lower plates toward the lower and upper plates, respectively, and connecting the upper and lower plates to each other; an inner fluid pathway formed at an inside of the plate by the plurality of connecting members; and two fluid communication portions for supplying and discharging the heating water,
wherein each of the connecting members extends at a sloping angle, such that upper and lower sides of the connecting member, facing each other while symmetrically extending from the upper and lower plates, respectively, converge to a bottom plane located at the center of the connecting member, and is defined with a circular or elliptical shape, respectively, at upper and lower portions of the connecting member where the connecting member starts to extend from the upper and lower plates, forming a circular or elliptical inner fluid pathway in the heating panel.

4. The heating system as set forth in claim 3, further comprising a sound absorbing/dampening layer formed between the floating floor structure and the slab.

5. The heating system as set forth in claim 3, further comprising a metal plate of high thermal conductivity disposed on the heating panel.

6. The heating system as set forth in claim 5, wherein the metal plate is made of aluminum coated steel plate.

7. The heating system as set forth in claim 3, wherein the floating floor structure comprises a plurality of supporting members spaced a predetermined distance from each other on the slab, and a plate member provided on the supporting members.

8. The heating system as set forth in claim 7, wherein the plate member and the supporting members are made of a wooden material.

9. The heating system as set forth in claim 7, wherein the plate member is made of a polymer resinous panel including sheet molding compound (SMC).

10. The heating system as set forth in claim 7, wherein the supporting members are fastened to the plate member with screws such that a height of the plate member above the slab may be adjusted.

11. The heating panel as set forth in claim 3, wherein the floating floor structure comprises a Styrofoam plate regularly defined with inner spaces at one side thereof facing the slab.

* * * * *